UNITED STATES PATENT OFFICE.

ADOLPH BAEYER, OF MUNICH, ASSIGNOR TO BADISCHE ANILIN AND SODA FABRIK, OF BADEN, GERMANY.

MANUFACTURE OF DYE-STUFF OR COLORING-MATTER.

SPECIFICATION forming part of Letters Patent No. 235,488, dated December 14, 1880.

Application filed November 10, 1880. (Specimens.)

*To all whom it may concern:*

Be it known that I, ADOLPH BAEYER, a subject of the King of Bavaria, residing at Munich, in the Kingdom of Bavaria and Empire of Germany, have invented new and useful Improvements in the Manufacture of Dye-Stuffs or Coloring-Matters, of which the following is a specification.

This invention consists in the discovery that improved dye-stuffs or coloring-matters may be obtained from the dye-stuff—artificial indigo—described in my application for Letters Patent filed November 9, 1880, which is produced by the action of suitable reducing or deoxidizing agents—such, for instance, as ferrous sulphate—upon a derivative of orthonitrophenylpropiolic acid, which results from a treatment of the said acid with sulphuric acid in the cold.

In carrying out my invention I take artificial indigo, as above indicated, and exhaust the same by repeated treatment with a cold and aqueous solution of sulphurous acid. The residues remaining form subject-matters for different Letters Patent. The extract obtained by the action of the sulphurous acid on the indigo is filtered, and the clear solution is decomposed by the addition of mineral acids, by preference, with heat, whereby a precipitate of the improved dye-stuff is formed, which, after washing, is ready for use.

The new dye-stuff has a dull blue crystalline appearance. It is soluble in aniline at ordinary temperatures, and readily soluble in sulphuric acid of 66° Baumé, showing a blue color instantly. It is not soluble in sulphurous acid.

I do not claim in this application for a patent the production of the dye-stuff or coloring-matter which I have designated "artificial indigo," such forming the subject-matter of a separate application filed, as hereinbefore stated, on the 9th of November, 1880.

What I claim as new, and desire to secure by Letters Patent, is—

1. As a new article of manufacture, the dye-stuff or coloring-matter produced by the action of sulphurous acid, followed by a mineral acid, upon the artificial indigo herein named, substantially as herein described, or by any other means which will produce a like result.

2. The within-described process for producing a dye-stuff or coloring-matter, by treating the artificial indigo herein named with sulphurous acid, followed by a mineral acid, substantially as herein set forth.

In testimony whereof I have hereunto set my hand and seal in the presence of two subscribing witnesses.

ADOLPH BAEYER. [L. S.]

Witnesses:
ALBIN SCHILLENZER,
VIGGO DREWSEN.